US010209973B2

(12) United States Patent
Ellis et al.

(10) Patent No.: US 10,209,973 B2
(45) Date of Patent: Feb. 19, 2019

(54) PRIVATE APPLICATION DISTRIBUTION MECHANISMS AND ARCHITECTURES

(71) Applicant: salesforce.com, inc., San Francisco, CA (US)

(72) Inventors: Ryan Ellis, San Francisco, CA (US); Pratima Nambiar, Sylvania, OH (US); Heather Conklin, San Francisco, CA (US); Jochem Ferdinand Geerdink, Madison, WI (US); Benjamin James, San Francisco, CA (US); Wilhelmina Baldwin, El Cerrito, CA (US); Kunal Vyas, Fremont, CA (US); Michael Patrick McGinty, Alameda, CA (US); Todd Edward Reasinger, San Francisco, CA (US); Noah Bruce Guyot, Mill Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 609 days.

(21) Appl. No.: 14/488,157

(22) Filed: Sep. 16, 2014

(65) Prior Publication Data
US 2016/0077817 A1    Mar. 17, 2016

(51) Int. Cl.
*G06F 8/60*    (2018.01)
*H04L 29/06*   (2006.01)
*H04L 29/08*   (2006.01)

(52) U.S. Cl.
CPC .............. *G06F 8/60* (2013.01); *H04L 63/101* (2013.01); *H04L 67/34* (2013.01)

(58) Field of Classification Search
CPC ........................................................ G06F 8/60
USPC ......................................................... 717/178
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Irvine and Maddocks, "Enabling Mobile Apps with IBM Worklight Application Center", Jun. 2013, IBM, ibm.com/redbooks, REDP-5005-00.*

*Primary Examiner* — James D. Rutten
(74) *Attorney, Agent, or Firm* — Jaffery, Watson, Mendonsa & Hamilton, LLC

(57) ABSTRACT

Private AppExchanges within an on-demand services environment in which multiple tenants have corresponding tenant identifiers (IDs) and the on-demand services environment is provided by an entity separate from the client entities. Access to a listing of apps is provided to a remote device based on a tenant ID associated with the user. The listing of apps for each tenant ID is controlled by an administrative entity associated with each respective tenant ID and. A download request is received from the remote device for a selected app from the listing. The remote device is allowed access only to the listing of apps having a tenant ID corresponding to the tenant ID for the remote device. Download access is granted to the remote device for a selected app in response to the download request. The code for the selected app is transmitted from a storage device to the remote device.

18 Claims, 8 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,334,720 B2 | 2/2008 | Hulst et al. |
| 7,340,411 B2 | 3/2008 | Cook |
| 7,620,655 B2 | 11/2009 | Larsson et al. |
| 7,942,317 B2 | 5/2011 | Racz et al. |
| 8,061,598 B2 | 11/2011 | Racz et al. |
| 8,118,221 B2 | 2/2012 | Racz et al. |
| 8,336,772 B2 | 12/2012 | Racz et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0262619 A1* | 10/2010 | Zargahi ............... G06F 8/61 707/770 |
| 2012/0072312 A1* | 3/2012 | Lange ............... G06Q 30/06 705/27.1 |
| 2013/0346268 A1* | 12/2013 | Pereira ............... G06F 8/65 705/34 |
| 2014/0007057 A1* | 1/2014 | Gill ............... G06F 8/61 717/126 |
| 2014/0099622 A1* | 4/2014 | Arnold ............... G09B 5/00 434/308 |
| 2014/0298404 A1* | 10/2014 | Qureshi ............... H04L 41/0816 726/1 |
| 2016/0301699 A1* | 10/2016 | Wang ............... H04L 63/10 |

\* cited by examiner

PRIVATE APPLICATION DISTRIBUTION MECHANISMS AND ARCHITECTURES

TECHNICAL FIELD

Embodiments relate to mechanisms for distribution of applications (apps). More particularly, embodiments relate to mechanisms for private app distribution that can be provided, for example, within an on-demand services environment.

BACKGROUND

An app is a (typically) self-contained program or piece of software designed to fulfill a particular purpose. An app is generally downloaded by a user to a mobile (e.g., smartphone, tablet) device, but apps can be provided to non-mobile (e.g., desktop, kiosk) device or a web application provided by a web browser. The traditional mechanism for distributing apps is to provide a "store" or other exchange that allows a user to access a collection of apps. This is typically arranged where a user has an account and can purchase the apps through the account. These stores are typically designed to have the greatest possible audience in order to provide greater sales. However, this structure does not work in all situations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
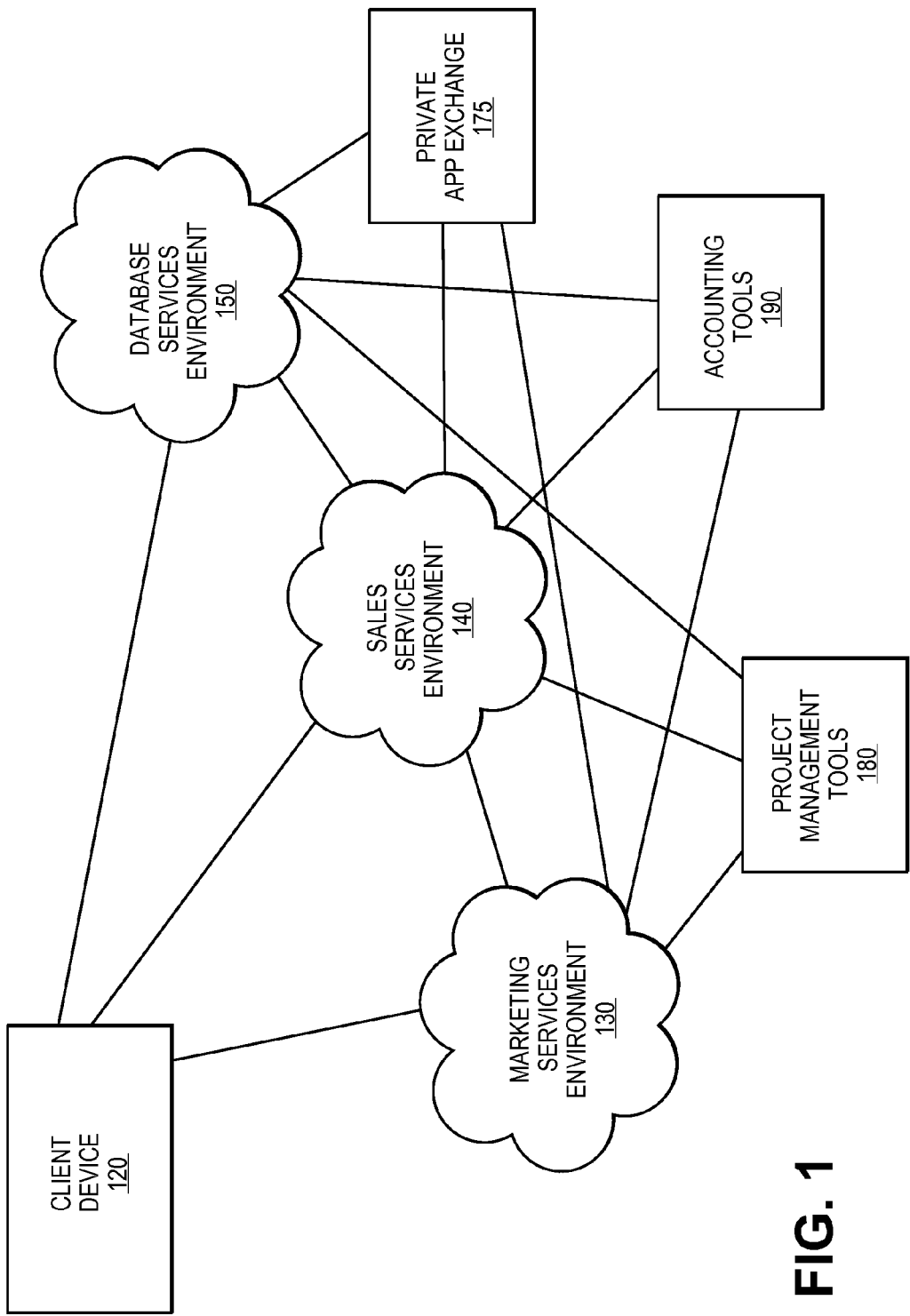
FIG. 1 is a conceptual diagram of on-demand services environments that can provide access to a private AppExchange.

In the following description, numerous specific details are set forth. However, embodiments of the invention may be practiced without these specific details. In other instances, well-known circuits, structures and techniques have not been shown in detail in order not to obscure the understanding of this description.

Described herein are techniques and architectures to provide a private AppExchange that can provide a custom listing of apps that can be private listing for employees/members specific organizations/corporations/groups/etc. In one embodiment, the private AppExchange can be provided in a multi-tenant environment, where a tenant can have its own private AppExchange in which apps specific to that tenant (as well as more general apps) can be accessible to individual users corresponding to the tenant. In one embodiment, the private AppExchange is platform-agnostic. That is, apps for multiple platform types (e.g., smartphones, tablets, laptops, wearable computing devices, desktops) can be provided.

In one embodiment, an administrator can list an app in multiple languages in the private AppExchange, with all language listings tied together and served in a default language, if possible. In one embodiment, each user within an organization can have a default language when accessing the private AppExchange. In one embodiment, the default language can be used if, for example, a user's preferred language is not available. In contrast, current app stores (i.e., not the private AppExchange described herein) are typically organized by geographic or political jurisdiction (e.g., country, region), which is based on commercial legal requirements rather than organizational efficiency.

In one embodiment, statistics are provided to an administrator of the private AppExchange based on language and/or geographical location. In one embodiment, the private AppExchange utilizes an approval/activation process. In one embodiment, a user needs approval and/or activation in order to download the app or to utilize the app on their device. In one embodiment, an administrator has access to statistical information related to activations/activation requests/access requests/etc.

In one embodiment, the private AppExchange includes a social media mechanism. For example, the private AppExchange can provide a social media feed for each app where a user can interact with developers and/or other users of the app. In one embodiment, when a user downloads or registers an app, that user can be subscribed to the social media feed for that app. With that social media feed, the user can interact with other users of the app and/or developers.

In one embodiment, a user may have an identity that can provide a single sign on functionality. The user identity can be used for accessing the private AppExchange without having to explicitly log in to the private AppExchange. The user identity can be used, for example, within a multi-tenant environment. In one embodiment, this single sign on identity can be used to utilized/sign in to the apps downloaded from the private AppExchange.

In one embodiment, the private AppExchange is responsive to device type. In one embodiment, the versions of the apps available can be filtered or sorted based on the device type. The private AppExchange can provide manual filtering functionality as well.

In one embodiment, the private AppExchange can be provided to users of multiple on-demand services environments corresponding to the same organization. For example, a user may have a user identity and can access various on-demand service environments (e.g., customer/sales services, marketing services) that corresponds to a single organization. The user may access the same private AppExchange through any of the on-demand services environments.

One example of a private AppExchange that can be supported is that of a car manufacturer that provides in-car functionality including access to one or more apps. The car manufacturer example is just one of many embodiments and environments that can utilize a private AppExchange. Returning to the automotive example, a car can have a touchscreen (or other type of) interface that can allow a user to access apps to be utilized by the car. Other types of interfaces can also be provided. The car can have access to a private AppExchange provided by, for example, the car manufacturer.

The private AppExchange in the automotive example can provide a group of apps from the manufacturer (e.g., diagnostics, customization, informational) that can be downloaded to the car. Additional apps from other sources (e.g., entertainment, navigation, traffic/weather conditions, social media, news, insurance, maintenance, local dealerships). As a variation on the automotive example, different models may have access to different apps via a common private AppExchange interface.

In one embodiment, the automotive private AppExchange can be provided by the car manufacturer to owners of the corresponding car brand. Various identifiers can be used to include the car as part of a group/organization for purposes of accessing the private AppExchange. The following is a few additional examples of environments in which a private AppExchange can be beneficial: sales organizations/departments, service organizations/departments, marketing organizations/departments, back office environments, mobile environments, social media environments, financial services organizations/departments, health care organizations/departments, government organizations, life sciences organizations.

FIG. 1 is a conceptual diagram of on-demand services environments that can provide access to a private AppExchange. The example of FIG. 1 is merely one of many configurations and environments in which a private AppExchange can be provided.

In one embodiment, a user may utilize client device 120 to access one or more of marketing services environment 130, sales services environment 140 and/or database services environment 150. In one embodiment each of marketing services environment 130, sales services environment 140 and/or database services environment 150 can be a multitenant on-demand services environment in which multiple tenants/organizations can have access to the environment while the data belonging to each tenant/organization is kept separate.

Marketing services environment 130 can, for example, provide marketing services such as email campaigns, social media marketing and analysis, online campaign services, mobile campaign services as well as data and/or analytics and/or marketing automation. Sales services environment 140 can, for example, provide customer relationship management (CRM) services of various types. Database services environment 150 can, for example, be a multitenant database environment.

In one embodiment, an on-demand services environment utilizes tenant/organization identifiers (IDs) within the on-demand services environment to allow individual tenants/organizations to access their data while preserving the integrity of other tenant's/organization's data. In one embodiment, a multitenant database environment, for example, stores data for multiple client entities each identified by a tenant/organization ID having one of one or more users associated with the tenant/organization ID. Users of each of multiple client entities can only access data identified by a tenant/organization ID associated with their respective client entity. In one embodiment, the multitenant database is a hosted database provided by an entity separate from the client entities, and provides on-demand and/or real-time database service to the client entities.

Client device 120 can be any type of electronic device that can access resources over a network. For example, client device 120 can be a laptop computer system, a desktop computer system, a smartphone, a tablet, a wearable computing device, etc. Client device 120 can interact with other electronic devices over wired and/or wireless networks. Services provided by marketing services environment 130, sales services environment 140 and/or database services environment 150 can be supplemented by additional nodes/devices/services, for example project management tools 180 and/or accounting tools 190.

In one embodiment, client device 120 can access a private AppExchange via one or more of marketing services environment 130, sales services environment 140 and/or database services environment 150. In one embodiment, a user of client device 120 can utilize a single identity to access one or more of marketing services environment 130, sales services environment 140 and/or database services environment 150.

In one embodiment, the private AppExchange 175 may be provided via any of the services environments to distribute any app, whether custom to the organization or not, via a central, private AppExchange. In one embodiment, the user experience in the private AppExchange 175 can be personalized by a user's role within the organization, a user's department, a user's business unit, a user's preferred language and/or other relevant factors. The apps made available at the private AppExchange can be publicly available apps and/or custom developed apps.

In one embodiment, private AppExchange 175 can be configured to distribute web-based, mobile and/or desktop apps that can be deployed to mobile devices, tablets, desktop, laptop devices with a single user entity. In one embodiment, each organization can customize the private AppExchange experience for users belonging to the organization.

Figure 2:
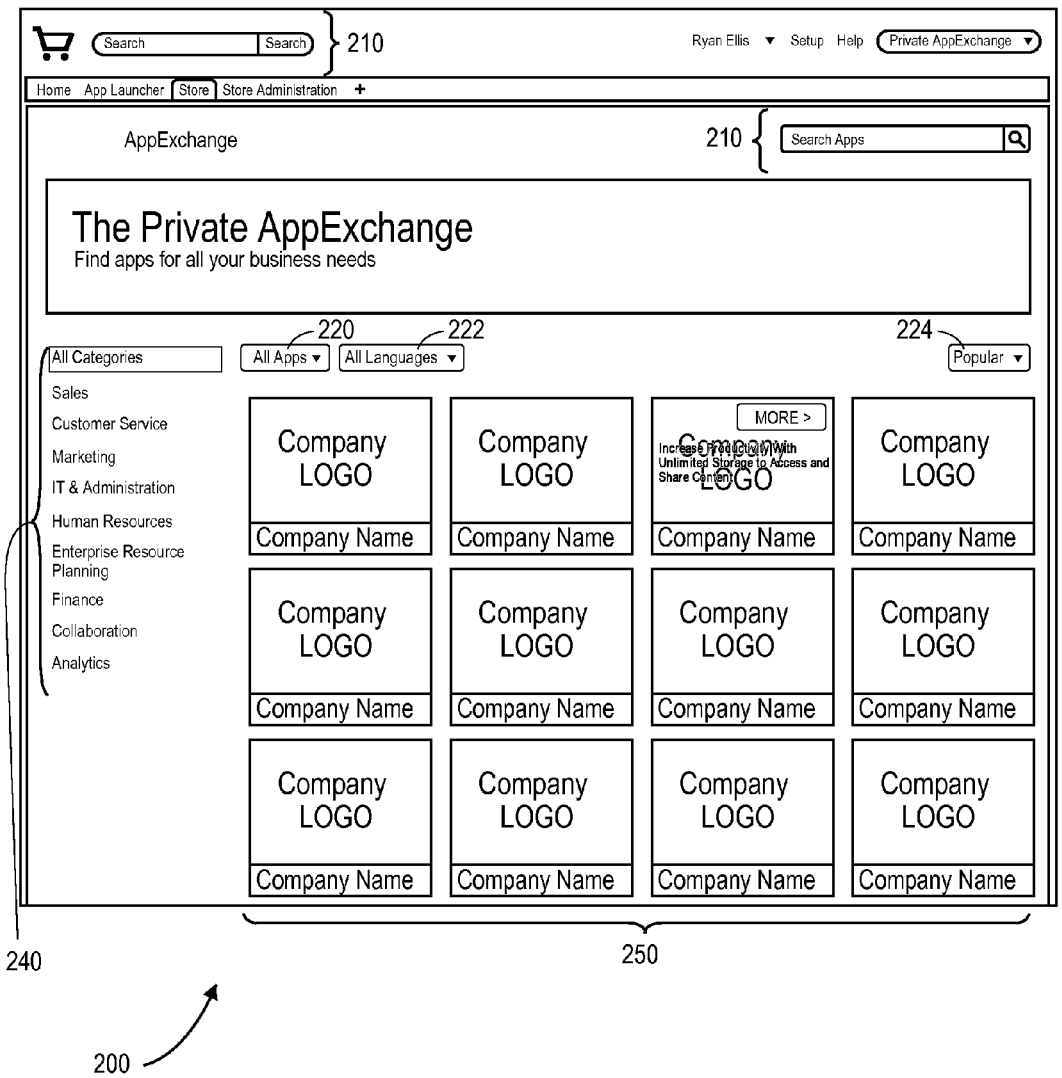
FIG. 2 is an example user interface for a private AppExchange.

FIG. 2 is an example user interface for a private AppExchange. The example of FIG. 2 is but one example of an interface that can provide access to apps as described herein. Many other configurations can also be utilized.

In one embodiment, the private AppExchange is accessed via browser window 200, which provides a user access to the features of the private AppExchange. In one embodiment, the private AppExchange provides search function 210 that allows a user to search for apps by, for example, name, functionality, type and/or other characteristics. Various filtering criteria may be applied. For example, apps may be filtered by type 220 (e.g., all apps, mobile apps, web apps), or by language 222 (e.g., all languages, English, Croatian, Western European) and/or other criteria. App can also be presented in various orders 224 (e.g., popularity, alphabetical, newest-to-oldest).

Various app categories 240 can be provided that can allow a user to narrow selections by category. In one embodiment, within a main screen area 250, various apps may be presented to the user. The user may be allowed to select one or more apps to utilize. In one embodiment, a user requests authorization before downloading the app. In other embodiments, the user may download the app and then request authorization, or the user may be allowed to download a trial version of the app, or the user may be allowed to use a limited version of the app.

Figure 3:
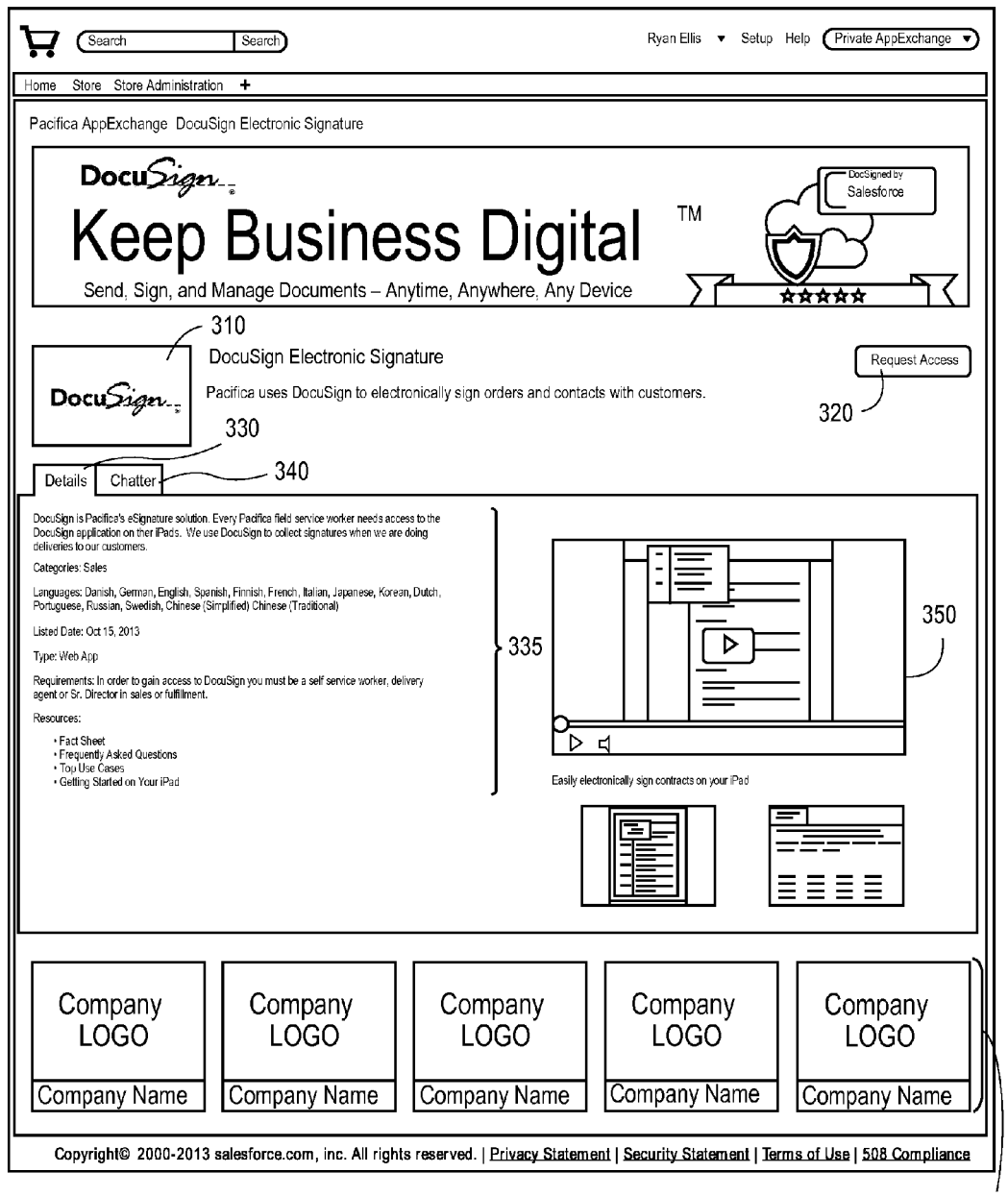
FIG. 3 is one embodiment of a user interface to provide information about a selected app.

FIG. 3 is one embodiment of a user interface to provide information about a selected app. In one embodiment, when a user selects an icon or name or other indicator of an app in the private AppExchange interface of FIG. 1, the user can be presented with detailed information for the selected app. The example of FIG. 2 is but one possible layout; other layouts and/or content can also be provided.

In one embodiment, an icon or other indicator, 310, is provided to indicate the app for which additional information is being provided. The interface may provide request button 320 or other mechanism for a user to request access/authorization for the selected app. If a user selects details tab 330, the interface may provide additional detailed information, 335, about the selected app.

In one embodiment, a social media tab, 340, is provided that can provide access to a social media feed corresponding to the selected app. More detail on the social media feed is provided below. Additional graphical and/or video information, 350, can be provided to the user. This may include video examples of the app functionality and/or training videos, screen shots and/or other additional information for the selected app. Similar/Related/Suggested apps may also be provided, 360.

Figure 4:
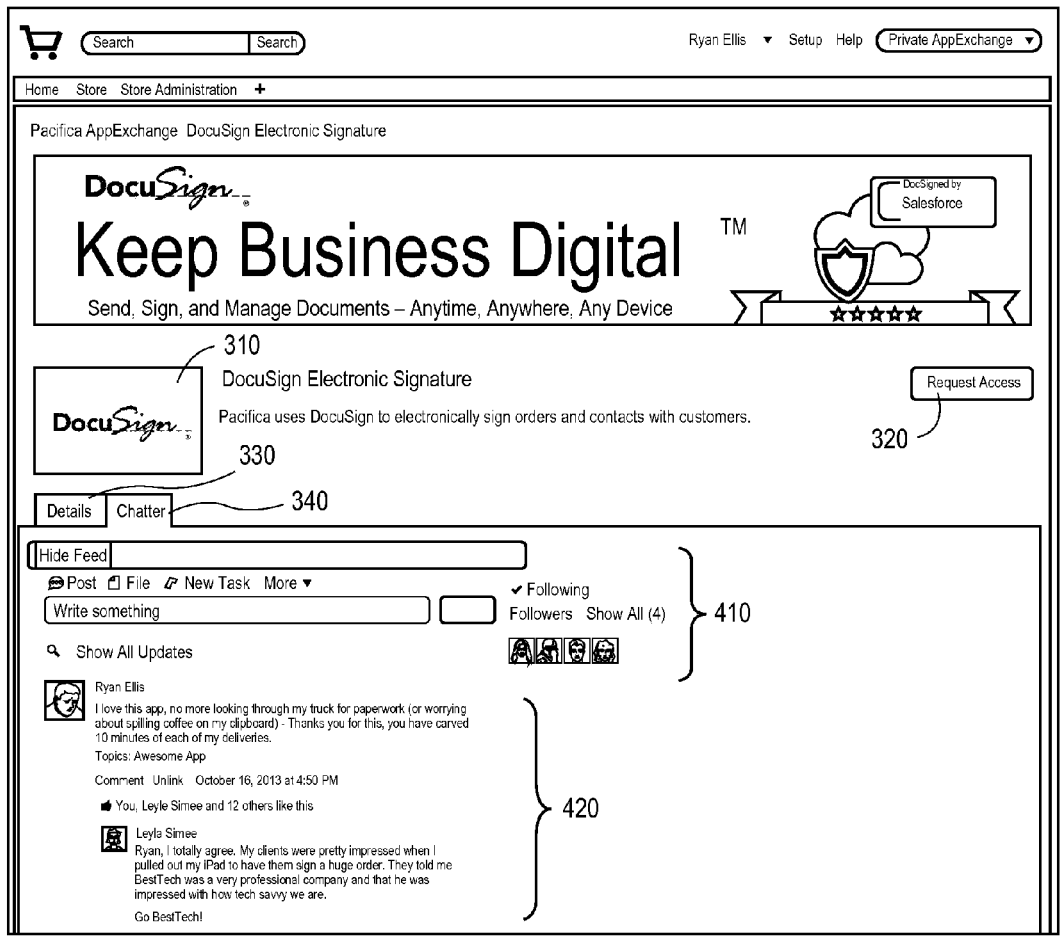
FIG. 4 is one embodiment of a user interface to provide a social media mechanism related to a selected app.

FIG. 4 is one embodiment of a user interface to provide a social media mechanism related to a selected app. Information/options related to the selected app can be provided using social media posts/feeds (e.g., Chatter, instant message, Facebook, Google+). In one embodiment, Chatter is a social media mechanism that provides a real-time collaboration platform for users. In one embodiment, Chatter has an associated service that sends information proactively via a real-time news stream that allows users to follow coworkers and data to receive broadcast updates about project and customer status and users can also form groups and post messages on each other's profiles to collaborate on projects. Chatter is provided by salesforce.com of San Francisco, Calif.

In another embodiment, instant messaging (IM), which is a form of communication over the Internet that offers quick transmission of text-based messages from sender to receiver, can be used. In push mode between two or more people using personal computers or other devices, along with shared clients, instant messaging offers real-time direct written language-based online chat. The user's text is conveyed over a network, such as the Internet. It may address point-to-point communications as well as multicast communications from one sender to many receivers. More advanced instant messaging allows enhanced modes of communication, such as live voice or video calling, video chat and inclusion of hyperlinks to media.

Social media feed 420 can provide posts/articles/notes from one or more users as well as selected updates/articles/other information. Social media feed 420 allows users, administrators, developers, managers and/or others involved with the app. In one embodiment, a user have their own social media feed that can be subscribed to the social media feed for the app when the user downloads the app.

In one embodiment, social media feed control mechanisms 410 allow the user to post comments, post files, filter and otherwise work with the social media feed. For example, other followers subscribed to the social media feed can be listed, filtering options can also be provided. Other social media tools can also be provided.

Figure 5:
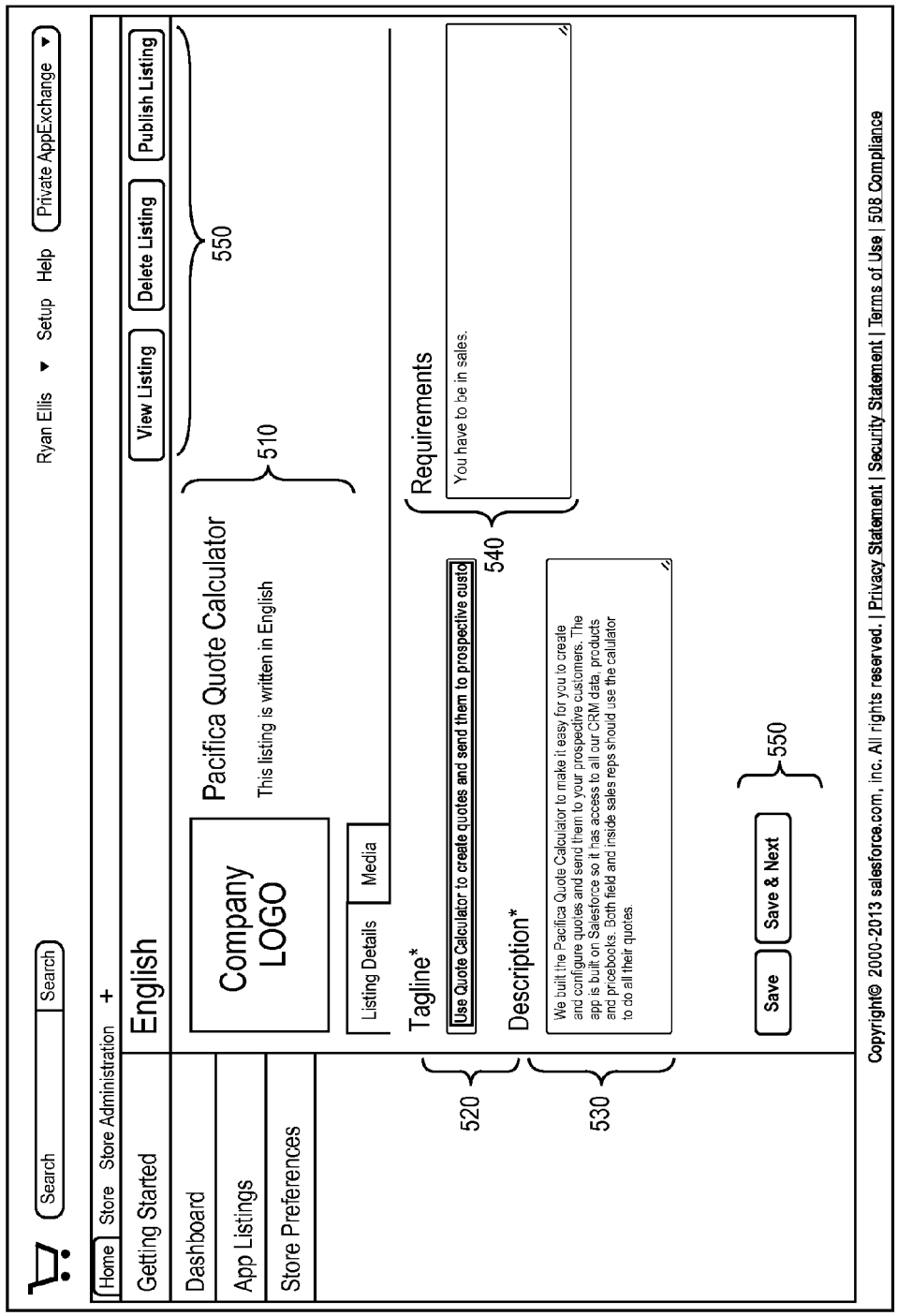
FIG. 5 illustrates one embodiment of a screen for listing an app in the private AppExchange.

FIG. 5 illustrates one embodiment of a screen for listing an app in the private AppExchange. The example of FIG. 5 is one example of a listing screen and other and/or different elements can be included.

The listing screen can include an app icon, name, subtitle and/or other general listing information, 510. In one embodiment, tagline 520 can be used when listing the app in the private AppExchange. Description field 530 can allow an administrator (or other person listing the app) to provide a description of the app that will be provided in the private AppExchange (e.g., 335 of FIG. 3). Requirements field 540 lists requirements (if any) for downloading/accessing/utilizing the app (e.g., the user must be in sales).

Control buttons 550 (e.g., View Listing, Delete Listing, Publish Listing, Save, Save & Next) allow the user to process the listing of the app. Other and/or different control configurations can also be supported/provided.

Figure 6:
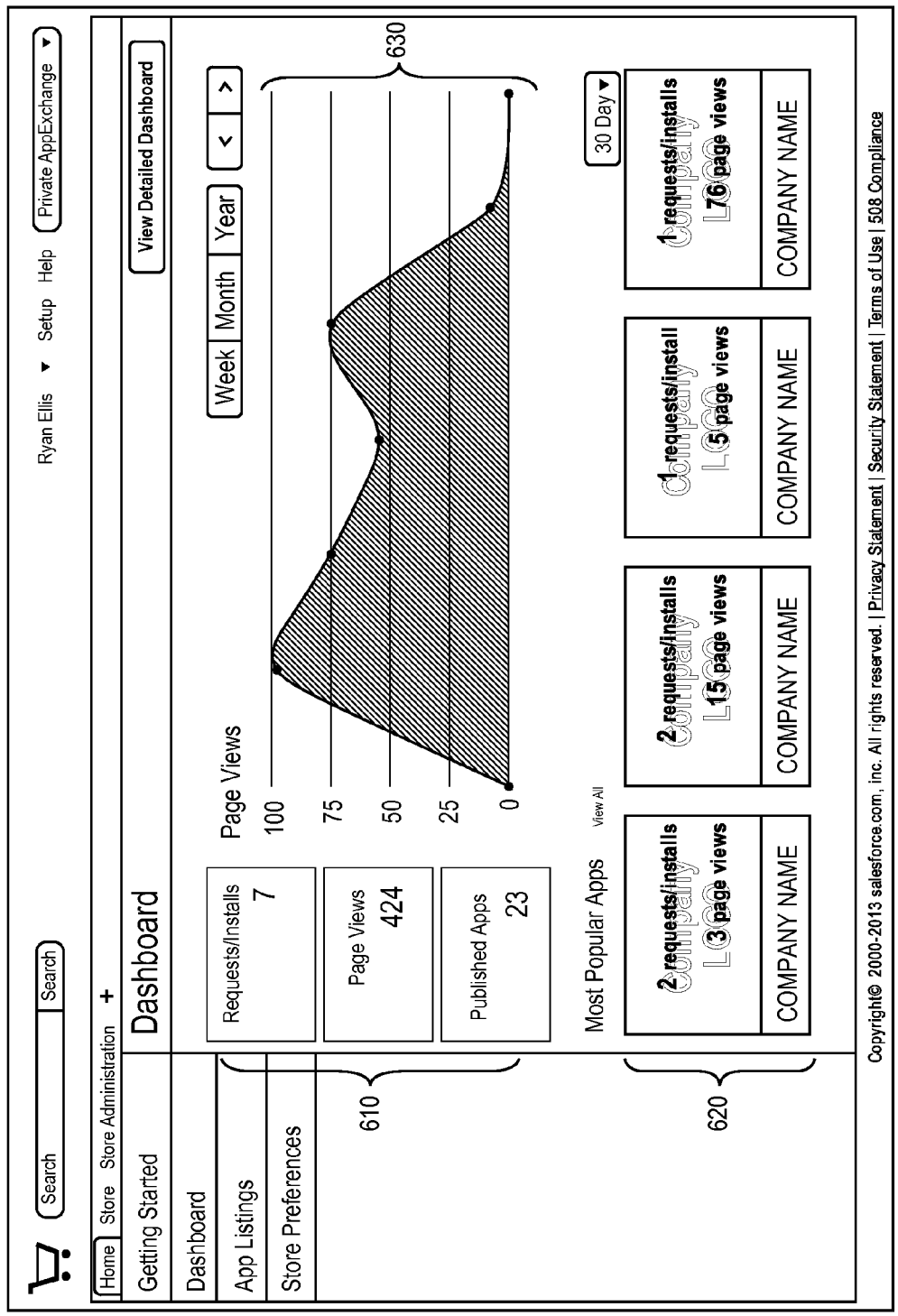
FIG. 6 illustrates one embodiment of a dashboard screen for providing statistical information related to an app in the private AppExchange.

FIG. 6 illustrates one embodiment of a dashboard screen for providing statistical information related to an app in the private AppExchange. The example of FIG. 6 is one example of a dashboard screen and other and/or different elements can be included.

The dashboard screen can include basic information including, for example, the number of requests/installs for the app, the number of page views, and the number of published apps, 610. Similar information can be provided for popular or related apps, 620. This information can also be presented graphically, 630.

Figure 7:
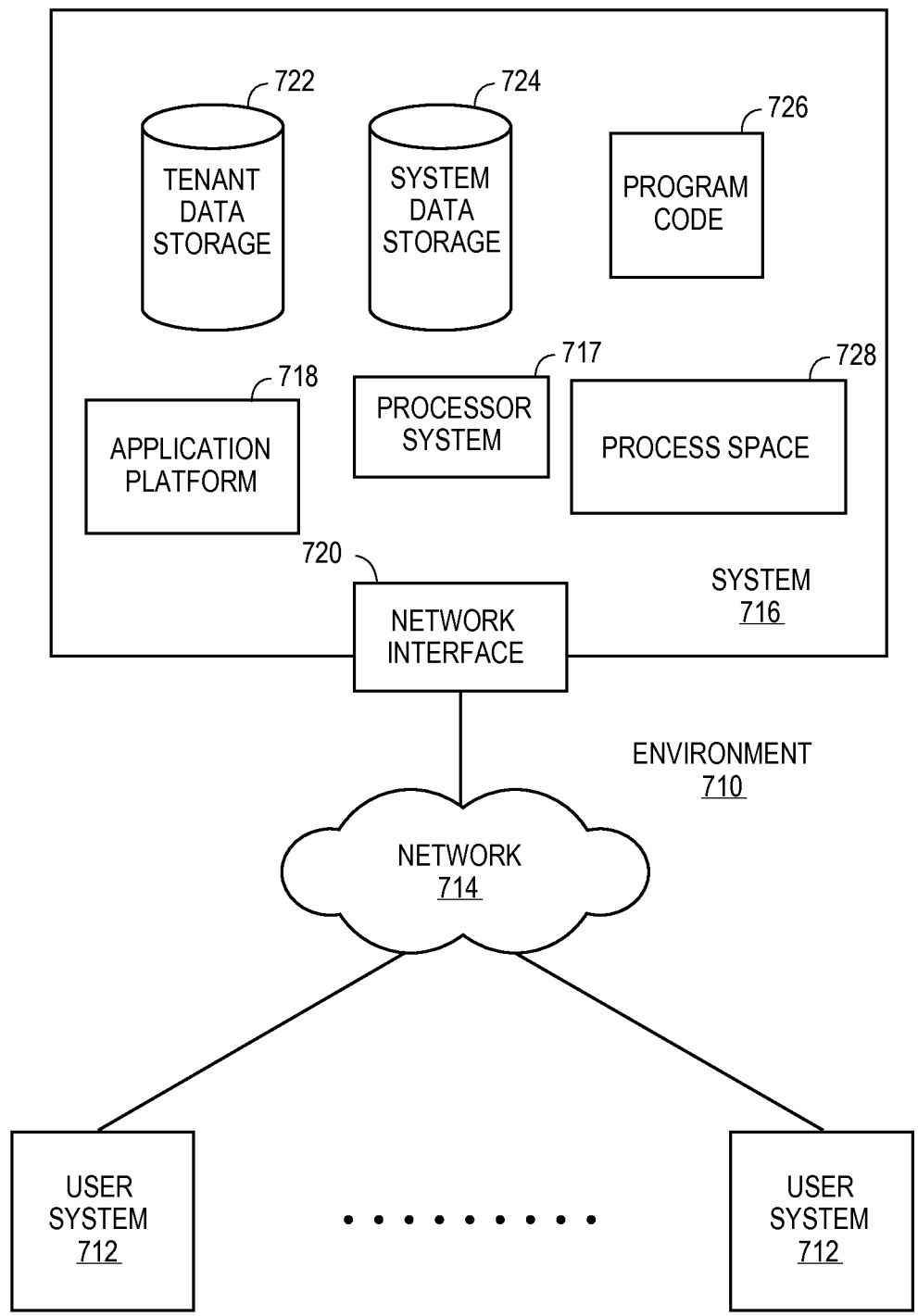
FIG. 7 is a block diagram of one environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 8:
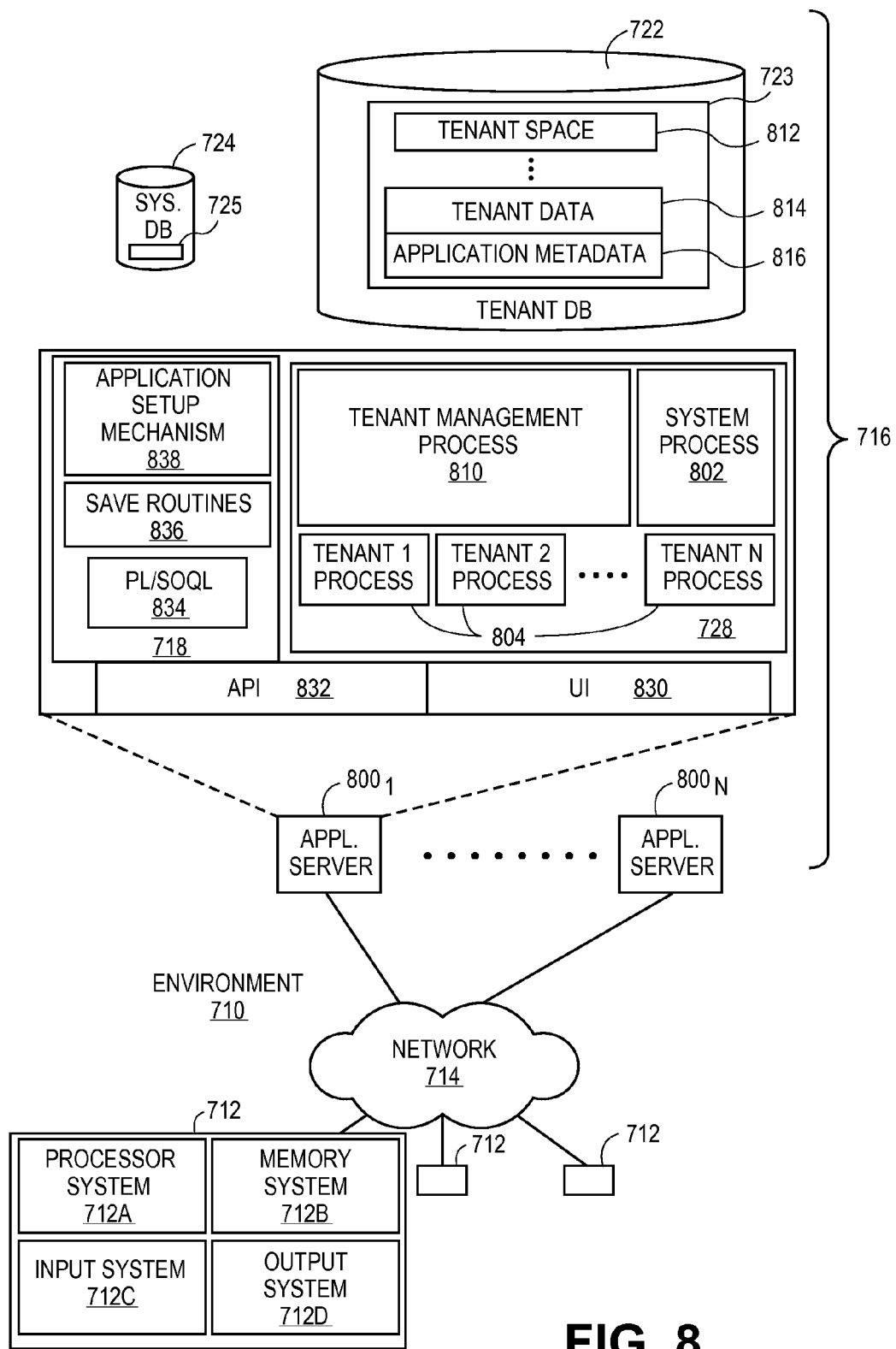
FIG. 8 is a block diagram of one embodiment of elements of environment of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800$_1$-800$_N$, system process space 802, tenant process spaces 804, tenant management process space 810, tenant storage area 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System For Allowing Access to Developed Applicants via a Multi-Tenant Database On-Demand Database Service" issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800$_1$ might be coupled via the network 714 (e.g., the Internet), another application server 800$_{N-1}$ might be coupled via a direct network link, and another application server 800$_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for providing private app listings within an on-demand services environment provided by one or more processors coupled with at least one memory device in which multiple tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities, the method comprising:

provide access to a listing of apps, with the one or more processors, to a remote device based on a tenant ID associated with the user, wherein the listing of apps for each tenant ID is controlled by an administrative entity associated with each respective tenant ID and the listing of apps is stored in a database within the on-demand services environment, wherein the listing of apps provided to the remote device is based, at least in part, on tenant ID so that the on-demand services environment provides tenant-specific listings of apps for individual users of the on-demand services environment where the listings include at least apps that are specific to the corresponding tenant and not available to other tenants, and wherein the listing of apps provided to the remote device are based on an authorization utilized to access the on-demand services environment without an additional authorization and further wherein at least a portion of the apps are for multiple platform types;

receiving download request, with the one or more processors, from the remote device for a selected app from the listing, wherein the remote device is allowed access only to the listing of apps having a tenant ID corresponding to the tenant ID for the remote device;

granting download access, with the one or more processors, to the remote device for a selected app in response to the download request, wherein the download access is associated with the tenant ID for the remote device;

causing transmission of code for the selected app from a storage device responsive to the on-demand services environment storing the code to the remote device;

receiving, with the one or more processors, from the remote device, a request for authorization to use the selected app; and determining, with the one or more processors, if the remote device is authorized to access the selected app; and transmitting, with the one or more processors, authorization to use the selected app if the remote device is authorized to use the selected app.

2. The method of claim 1 further comprising providing a social media feed with the listing of apps corresponding to the selected app, wherein the social media feed provides posts related to the selected app.

3. The method of claim 2, wherein the social media feed includes at least a training video for the selected app.

4. The method of claim 1 wherein the listing of apps is provided by language to multiple political jurisdictions.

5. The method of claim 1 wherein the listing of apps comprises apps for mobile devices and apps for desktop devices.

6. The method of claim 1, wherein the listing of apps is provided to users of multiple on-demand services environments corresponding to the same organization.

7. A non-transitory computer-readable medium having stored thereon instructions that, when executed by one or more processors, cause the one or more processors to providing private app listings within an on-demand services environment provided by one or more processors coupled with at least one memory device in which multiple tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities, the instructions, when executed, cause the one or more processors to:

provide access to a listing of apps, with the one or more processors, to a remote device based on a tenant ID associated with the user, wherein the listing of apps for each tenant ID is controlled by an administrative entity associated with each respective tenant ID and the listing of apps is stored in a database within the on-demand services environment, wherein the listing of apps provided to the remote device is based, at least in part, on tenant ID so that the on-demand services environment provides tenant-specific listings of apps for individual users of the on-demand services environment where the listings include at least apps that are specific to the corresponding tenant and not available to other tenants, and wherein the listing of apps provided to the remote device are based on an authorization utilized to access the on-demand services environment without an additional authorization and further wherein at least a portion of the apps are for multiple platform types;

receive download request, with the one or more processors, from the remote device for a selected app from the listing, wherein the remote device is allowed access only to the listing of apps having a tenant ID corresponding to the tenant ID for the remote device;

grant download access, with the one or more processors, to the remote device for a selected app in response to the download request, wherein the download access is associated with the tenant ID for the remote device;

cause transmission of code, with the one or more processors, for the selected app from a storage device responsive to the on-demand services environment storing the code to the remote device;

receive, with the one or more processors, from the remote device, a request for authorization to use the selected app; and determine, with the one or more processors, if the remote device is authorized to access the selected app; and transmit, with the one or more processors, authorization to use the selected app if the remote device is authorized to use the selected app.

8. The computer-readable medium of claim 7 further comprising instructions that, when executed, provide a social media feed with the listing of apps corresponding to the selected app, wherein the social media feed provides posts related to the selected app.

9. The computer-readable medium of claim 8, wherein the social media feed includes at least a training video for the selected app.

10. The computer-readable medium of claim 7 wherein the listing of apps is provided by language to multiple political jurisdictions.

11. The computer-readable medium of claim 7 wherein the listing of apps comprises apps for mobile devices and apps for desktop devices.

12. The computer-readable medium of claim 7, wherein the listing of apps is provided to users of multiple on-demand services environments corresponding to the same organization.

13. A system having one or more processors to provide private app listings within an on-demand services environment provided by one or more processors coupled with at least one memory device in which multiple tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities, the one or more processors to:

provide access to a listing of apps, with the one or more processors, to a remote device based on a tenant ID associated with the user, wherein the listing of apps for each tenant ID is controlled by an administrative entity associated with each respective tenant ID and the listing of apps is stored in a database within the on-demand services environment, wherein the listing of apps provided to the remote device is based, at least in part, on tenant ID so that the on-demand services environment provides tenant-specific listings of apps for individual users of the on-demand services environment where the listings include at least apps that are specific to the corresponding tenant and not available to other tenants, and wherein the listing of apps provided to the remote device are based on an authorization utilized to access the on-demand services environment without an additional authorization and further wherein at least a portion of the apps are for multiple platform types;

receive download request, with the one or more processors, from the remote device for a selected app from the listing, wherein the remote device is allowed access only to the listing of apps having a tenant ID corresponding to the tenant ID for the remote device;

grant download access, with the one or more processors, to the remote device for a selected app in response to the download request, wherein the download access is associated with the tenant ID for the remote device;

cause transmission of code, with the one or more processors, for the selected app from a storage device responsive to the on-demand services environment storing the code to the remote device;

receive, with the one or more processors, from the remote device, a request for authorization to use the selected app; and determine, with the one or more processors, if the remote device is authorized to access the selected app; and transmit, with the one or more processors, authorization to use the selected app if the remote device is authorized to use the selected app.

14. The system of claim 13 further to provide a social media feed with the listing of apps corresponding to the selected app, wherein the social media feed provides posts related to the selected app.

15. The system of claim 14, wherein the social media feed includes at least a training video for the selected app.

16. The system of claim 13 wherein the listing of apps is provided by language to multiple political jurisdictions.

17. The system of claim 13 wherein the listing of apps comprises apps for mobile devices and apps for desktop devices.

18. The system of claim 13, wherein the listing of apps is provided to users of multiple on-demand services environments corresponding to the same organization.

* * * * *